(No Model.)
D. B. SWEET.
PHOTOGRAPHIC SHUTTER.
No. 292,707. Patented Jan. 29, 1884.
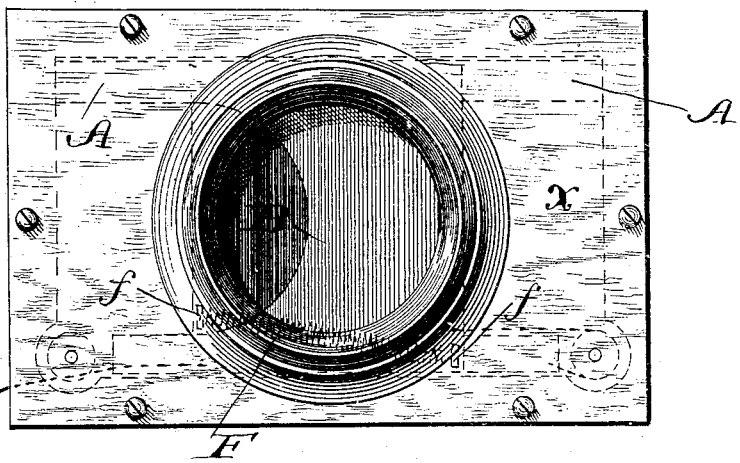
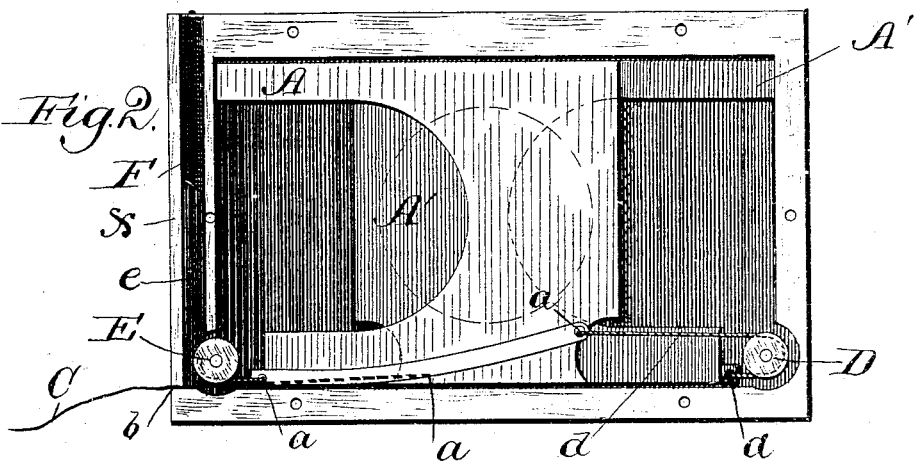
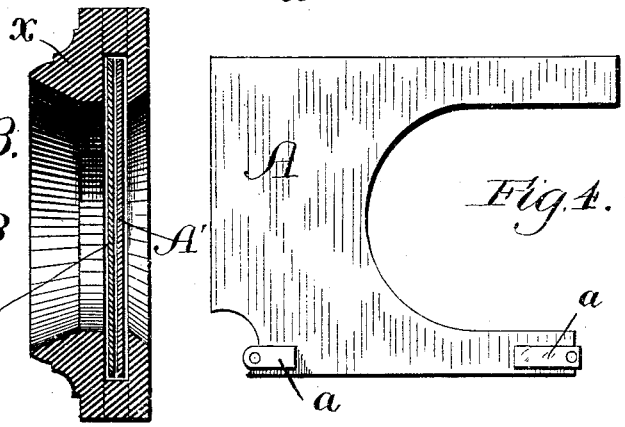
Witnesses:
Chas. E. Gaylord.
F. L. Brown.
Inventor:
Dexter B. Sweet
by Charles T. Brown
Att'y.

UNITED STATES PATENT OFFICE.

DEXTER B. SWEET, OF ENGLEWOOD, ILLINOIS.

PHOTOGRAPHIC SHUTTER.

SPECIFICATION forming part of Letters Patent No. 292,707, dated January 29, 1884.

Application filed November 19, 1883. (No model.)

*To all whom it may concern:*

Be it known that I, DEXTER B. SWEET, a citizen of the United States, residing at Englewood, in the county of Cook and State of Illinois, have invented certain new and useful Improvements in Shutters or Slides to be used in Photographic Cameras and for like purposes, of which the following is a specification.

I am aware that various methods have been heretofore in use for uncovering the lens of photographic cameras and thus admitting rays of light through the same to the surface of the prepared or sensitized plate placed in the camera for the purpose of such exposure; and I am further aware that among such devices there have been used swinging and sliding doors or shutters of various forms and designs—as, for instance, doors having a straight or perpendicular edge, the one door overlapping the other, on a line passing perpendicularly through or near the center of the lens sufficiently to prevent the admission of any rays of light, and also sliding doors, having round holes in the same, said last-named doors also overlapping in such a manner that when the slide is closed no rays of light can pass through the same, and that various methods of causing the simultaneous sliding or swinging of such doors have been heretofore used. I do not, therefore, desire to claim, broadly, the use of sliding doors overlapping each other in such a manner that when closed no rays of light can pass through the same, and connected together in such a way as to simultaneously recede from such closed or overlapping position in order to open and produce the desired aperture for the admission of light-rays to the plate to be exposed.

The object of my invention is to economically produce a light, simple, and effective photographic shutter or slide, which will be certain in its action, durable in its character, and not liable to get out of order, and at the same time to obtain all the advantages secured by a photographic shutter, in which the rays of light passing through the center of the lens are first admitted to the exposed plate; and I accomplish these results in the manner hereinafter described.

I have illustrated my invention by the drawings accompanying this specification, and forming a part hereof, in which—

Figure 1 is a view of the shutter when closed and ready for use, showing by dotted lines a portion of the details of construction. Fig. 2 is a plan of the shutter, having one side of the frame removed. Fig. 3 is a section of my improved photographic shutter. Fig. 4 is a plan of the shutters or sliding doors employed by me.

Like letters refer to like parts throughout the several views.

X is the frame.

A A' are the shutters or sliding doors.

$a\ a$ are studs or eyelets attached to or on sliding doors A A'.

B is a circular opening in the frame X, which is alternately opened and closed by the movement of sliding doors A A'.

$b$ is a hole in frame X, through which cord C is passed.

C is a string or cord by which my improved shutter is operated.

D and E are pulleys or wheels over or around which cords $d$ and $e$ turn or pass.

F is a spring, by means of which sliding doors A A' are automatically drawn together or closed.

$f\ f$ are studs, which may be used, if preferred, on sliding doors A A', respectively, and to which spring F may be secured. When spring F is attached in this manner to studs $f\ f$, the use of wheel E and cord $e$ is dispensed with. When spring F is not attached to studs $f\ f$ on shutters A A', as just stated, and cord $e$ and wheel E are used, the arrangement is as follows: One end of operating-cord C is passed through hole $b$ in frame X and secured to eyelet $a$ in shutter A, the other end of cord C hanging loosely outside of said frame X; cord or string $d$ is secured by one end to eyelet $a$ on shutter A, and, passing around or over wheel D, is secured by the other end to eyelet $a$ in shutter A'; and cord $e$ is secured by one end to eyelet or stud $a$ on shutter A', and, passing around or over wheel E, is secured by the other end to one end of spring F. Spring F is secured or attached at the other end to frame X.

The manner of operation of my improved invention is as follows: When it is desired to open aperture B, so that rays of light may pass through the same, cord C is grasped or taken hold of and drawn toward the operator. By this means slide A, attached thereto by means of stud or eyelet a, is drawn or pulled in the same direction as cord C. At the same time the end of cord d, attached to slide A by means of stud or eyelet a, is pulled or drawn in the same direction, and, the said cord passing over or around wheel or pulley D, the other end thereof, secured to sliding door A', is pulled or drawn in the opposite direction, and thus sliding door A' is caused to move simultaneously an equal distance with sliding door A, but in the opposite direction. Spring F, when arranged as shown in Fig. 1 and fastened to studs or eyelets f f, by the movement in opposite directions, as described, of sliding doors A A', will move in unison therewith, and thus spring F will be lengthened, and when cord C is released spring F will immediately resume its original position, and slides or sliding doors A A' will thus be again closed. If spring F is attached to slide A' in the manner shown in Fig. 2, by means of spring or cord e, the movement of slide A', as described, will cause spring F to be extended, and when cord or string C is released spring F will return to its original position, and, by means of string or cord e, slide A' will be returned to its original position, and at the same time slide A, through cord d, will also be returned to its original position, and aperture B will thus again be closed.

Having thus described my invention and its method of operation, what I claim, and desire to secure by Letters Patent, is—

1. In a photographic shutter, the combination of frame X, having aperture B, slides A A', spring F, studs f f, cord C, cord d, and wheel or pulley D, all arranged, operated, and controlled substantially as described, and for the purpose specified.

2. In a photographic shutter, frame X, having aperture B, and slides A A', in combination with spring F, cord e, pulley or wheel E, cord d, pulley or wheel D, and cord C, all substantially as described, and for the purpose specified.

DEXTER B. SWEET.

Witnesses:
   F. L. BROWN,
   L. C. NEWTON.